US012761123B2

(12) United States Patent
Steele

(10) Patent No.: US 12,761,123 B2
(45) Date of Patent: Oct. 13, 2026

(54) GAS SAMPLING VALVE APPARATUS AND METHOD

(71) Applicant: Stratum Reservoir (US), LLC, Houston, TX (US)

(72) Inventor: Gavin A. Steele, White Heath, IL (US)

(73) Assignee: Stratum Reservoir (US), LLC, Houston, TX (US)

( * ) Notice: Subject to any disclaimer, the term of this patent is extended or adjusted under 35 U.S.C. 154(b) by 0 days.

(21) Appl. No.: 18/568,529

(22) PCT Filed: Sep. 21, 2023

(86) PCT No.: PCT/US2023/033349

§ 371 (c)(1),
(2) Date: Dec. 8, 2023

(87) PCT Pub. No.: WO2024/064262

PCT Pub. Date: Mar. 28, 2024

(65) Prior Publication Data

US 2025/0244210 A1 Jul. 31, 2025

Related U.S. Application Data

(60) Provisional application No. 63/409,284, filed on Sep. 23, 2022.

(51) Int. Cl.
*G01N 1/22* (2006.01)

(52) U.S. Cl.
CPC .................................. *G01N 1/2247* (2013.01)

(58) Field of Classification Search
CPC ............................... G01N 1/2247; G01N 1/00
See application file for complete search history.

(56) References Cited

U.S. PATENT DOCUMENTS 4,173,895 A * 11/1979 Pecor ........................ G01N 1/10 73/864
8,322,199 B2 * 12/2012 Reed .................... G01N 35/085 422/131

(Continued)

FOREIGN PATENT DOCUMENTS

CN 107219073 A * 9/2017 ............ G01M 13/00
EP 0660026 A1 * 6/1995 .............. F17C 5/005

(Continued)

OTHER PUBLICATIONS

International Search Report and Written Opinion of Application No. PCT/US2023/033349 dated Apr. 11, 2024.

*Primary Examiner* — Jamel E Williams
(74) *Attorney, Agent, or Firm* — Morgan, Lewis & Bockius LLP

(57) ABSTRACT

A valve assembly and chuck system for a gas sampling apparatus. In one embodiment, the apparatus may comprise a valve assembly comprising a core valve, wherein a pin of the core valve is biased to a first closed position; an automated chuck system comprising a chuck body, and interrupter system, and a photodetector system, wherein upon being moved toward the valve assembly the interrupter system is displaced within the chuck system, thereby causing the photosensor system to detect and control the progression of the chuck system toward a fully seated configuration against the valve system.

18 Claims, 14 Drawing Sheets

(56) References Cited

U.S. PATENT DOCUMENTS

| | | | | |
|---|---|---|---|---|
| 2009/0158863 | A1* | 6/2009 | Shanafelter | G01N 35/021 73/864.81 |
| 2013/0078733 | A1* | 3/2013 | Holmes | B01L 3/50825 422/524 |
| 2014/0041753 | A1* | 2/2014 | Beranger | B05B 11/0056 141/18 |
| 2024/0344936 | A1* | 10/2024 | Steele | B65D 83/48 |
| 2025/0164354 | A1* | 5/2025 | Steele | G01N 1/2226 |

FOREIGN PATENT DOCUMENTS

| | | | | | |
|---|---|---|---|---|---|
| EP | 0660026 | B1 | | 6/1995 | |
| FR | 1327130 | A | * | 4/1962 | |
| KR | 100817696 | B1 | | 3/2008 | |
| WO | WO-2010135419 | A1 | * | 11/2010 | F16K 31/46 |
| WO | WO-2016154269 | A1 | * | 9/2016 | B65B 3/10 |

* cited by examiner

GAS SAMPLING VALVE APPARATUS AND METHOD

CROSS-REFERENCE TO RELATED APPLICATIONS

This application claims priority to U.S. Provisional Application No. 63/409,284 filed on Sep. 23, 2022, which is incorporated herein by reference.

STATEMENT REGARDING FEDERALLY SPONSORED RESEARCH OR DEVELOPMENT

Not applicable.

BACKGROUND OF THE INVENTION

Field of the Invention

The present invention relates to the collection, transportation, and analysis of fluid samples which may be desired in various scientific, environmental, and resource contexts. More specifically, the present invention relates to pressurized container valves and valve-actuating apparatuses and methods.

Background of the Invention

Various methods and systems have been proposed and utilized for collecting, transporting, and analyzing fluid and gas samples, including some of the methods and systems disclosed in the references appearing on the face of this patent. However, those methods and systems lack all the steps or features of the methods and systems covered by any patent claims below. As will be apparent to a person of ordinary skill in the art, any methods and systems covered by claims of the issued patent solve many of the problems that prior art methods and systems have failed to solve. Also, the methods and systems covered by at least some of the claims of this patent have benefits that could be surprising and unexpected to a person of ordinary skill in the art based on the prior art existing at the time of invention.

Pressurized gas sampling containers may be commonly used in the collection, transportation and analysis of gas samples which may be involved in various scientific, environmental, and resource contexts. The oil and gas industry may provide an exemplary context in which to examine the need for collecting, transporting, and analyzing fluid samples.

In oil and natural gas exploration, drilling, recovery, and storage, periodic sampling of recovered gases and fluids may be desired for subsequent analysis. For example, the term “mud” may be used as a colloquial term for a thick chemical composition that is pumped into drills as they penetrate the substrate. This “mud” may be subsequently returned to the surface and may contain gases that are released from the rock as the drill penetrates through a geological formation. Significant data of interest may be acquired by analyzing these gases. Separately, in the context of natural gas storage, large underground storage deposits may often be chemically tagged for later identification.

The apparatus and methods disclosed herein may improve the methods through which collection, transportation, and analysis of samples from these exemplary industrial applications may be performed, providing benefits in the process of obtaining such drilling data or identifying such chemical tags. The apparatus and methods may have suitable application across a number of industries beyond oil and gas.

BRIEF SUMMARY OF SOME OF THE PREFERRED EMBODIMENTS

The embodiments disclosed herein may comprise a valve assembly and an automated chuck system for a gas sampling apparatus. In one embodiment, the apparatus may comprise a valve assembly comprising a core valve, wherein a pin of the core valve is biased to a first closed position; an automated chuck system comprising a chuck body, an interrupter system, and a photodetector system, wherein upon being moved toward the valve assembly the interrupter system is displaced within the chuck system, thereby causing the photosensor system to detect and control the progression of the chuck system toward a fully seated configuration against the valve system.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
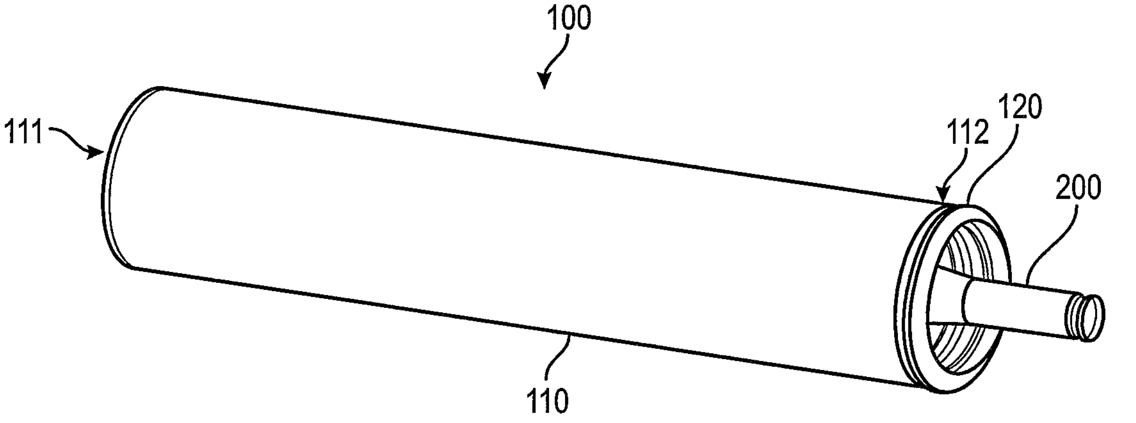
FIG. 1 illustrates an isometric view of an embodiment of a gas sampling container.

A detailed description will now be provided. The purpose of this detailed description, which includes the drawings, is to satisfy the statutory requirements of 35 U.S.C. § 112. For example, the detailed description includes a description of the inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details of the systems, nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in any printed publication, dictionary, or issued patent.

Now, certain specific embodiments are described, which are by no means an exclusive description of the inventions. Other specific embodiments, including those referenced in the drawings, are encompassed by this application and any patent that issues therefrom.

One or more specific embodiments disclosed herein includes a method for sampling gas, comprising providing a gas sampling system comprising: a container, wherein the container comprises a cylindrical shape with a closed first end and an open second end, a cap, wherein the cap is sealably secured within the open second end and comprises a cap aperture, a valve assembly, wherein the valve assembly is sealably secured within the cap aperture and comprises a valve body exterior end, and a chuck system comprising a chuck housing, a chuck locking pin, a chuck pin, and an automated chuck subsystem, wherein the automated chuck subsystem comprises a chuck body, an interrupter system, and a photosensor system, further wherein the interrupter system comprises an interrupter sleeve and one or more interrupters, wherein the one or more interrupters each comprise an interrupter tip, wherein each interrupter tip comprises a tip aperture, and further wherein the chuck housing further comprises one or more angular internal profile apertures and one or more internal wall cavities, and further wherein the photosensor system comprises a photosensor, wherein the photosensor comprises and emitter side and a sensor side; providing a controller employing a stepper motor; activating the stepper motor such that the interrupter sleeve seats against the valve body exterior end, wherein the valve body second end is guided by one of the angular internal profile apertures, and further wherein the interrupter sleeve is unseated from against one of the internal wall cavities of the chuck housing; deactivating the stepper motor; reactivating the stepper motor such that the interrupter tip is introduced into the photosensor, wherein optical communication between the emitter side and the sensor side is suspended; deactivating the stepper motor; reactivating the stepper motor such that the tip aperture of the interrupter tip is aligned within the photosensor, wherein optical communication between the emitter side and the sensor side is restored; and deactivating the stepper motor.

In any one of the methods or systems disclosed herein, the chuck body may comprise a mating projection.

In any one of the methods or systems disclosed herein, the chuck body may comprise a mounting surface.

In any one of the methods or systems disclosed herein, the chuck body may comprise one or more ports.

In any one of the methods or systems disclosed herein, the interrupter system may comprise a biasing element.

In any one of the methods or systems disclosed herein, the photosensor system may comprise a printed circuit board.

In any one of the methods or systems disclosed herein, the mating projection may comprise a stepped outer profile, wherein the stepped outer profile comprises one or more recessed profiles, wherein each of the one or more recessed profiles are adapted to receive a sealing element.

In any one of the methods or systems disclosed herein, the chuck body may comprise an inlet line.

The drawings presented herein are for illustrative purposes only and are not intended to limit the scope of the claims. Rather, the drawings are intended to help enable one having ordinary skill in the art to make and use the claimed inventions.

Figure 2:
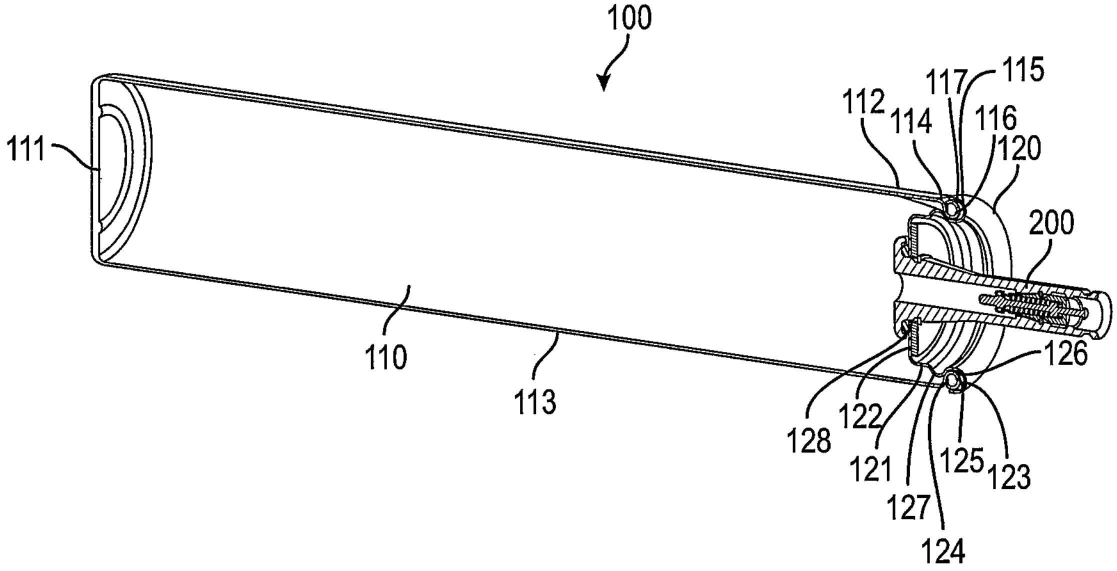
FIG. 2 illustrates an isometric view of an embodiment of a gas sampling container cap and valve assembly.

FIGS. 1 and 2 illustrate an embodiment of a fluid container 100, comprising a container body 110 having a closed first end 111 and an open second end 112, a cap 120, and a valve assembly 200.

In embodiments, container body 110 may comprise a container wall 113, which may extend from closed first end 111 toward second open end 112. In embodiments, open second end 112 may comprise a rolled lip 114 formed by container wall 113 being formed inward toward the longitudinal midline of container body 110 then outward to such an extent that container wall 113 touches itself at a point 115, thus forming rolled lip 114 having an outer curved surface 116.

In embodiments, cap 120 may be cup-shaped and formed having a diameter such that cap sides 121 may communicate with rolled lip 114 while allowing a cap bottom 122 to slide within container body 110, allowing a partially rolled flange 123 to also communicate with rolled lip 114. In embodiments, partially rolled flange 123 may be formed in such a way as to allow an inner curved surface 124 to communicate with outer curved surface 116 of rolled lip 114. In embodiments, cap 120 may further comprise an aperture 128, which may be adapted to receive valve assembly 200.

In embodiments, container body 110 and cap 120 may be composed of any substance of suitable strength for containing compressed or pressurized gasses or liquids. In embodiments, container body 110 and cap 120 may be formed of any suitable metallic or non-metallic material, for example aluminum, steel, or other suitable materials.

In embodiments, one or more sealing elements 126 may be disposed between inner curved surface 124 and outer curved surface 116 of rolled lip 114. In embodiments, each of the one or more sealing elements 126 may be annular in shape and rest on inner curved surface 124, such that when cap 120 is fully inserted into container body 110, partially rolled flange 123 may communicate with the one or more sealing elements 126, which in turn may communicate with outer curved surface 116 of rolled lip 114, forming an air and/or gas tight seal. In embodiments, partially rolled flange 123 may then be rolled or crimped, which may cause a flange end 125 to be pressed under rolled lip 114 at a point 117. In embodiments, this may tightly compress the one or more sealing elements 126, which may allow fluid container 100 to be sufficiently sealed as to allow fluid container 100 to contain compressed or pressurized gasses or liquids. In embodiments, cap 120 may be attached to container body 110 when a crimp 127 is formed, simultaneously flange 123 and outer curved surface 116 may compress one or more sealing elements 126 to form a seal. In embodiments, the one or more sealing elements 126 may comprise a gasket. In an alternate crimping method, a portion of cap sides 121 may be expanded into cap side lip 127 such that cap side lip 127 may apply pressure under rolled lip 114, which may further enhance the ability of fluid container 100 to contain compressed or pressurized gasses or liquids.

Figure 3A:
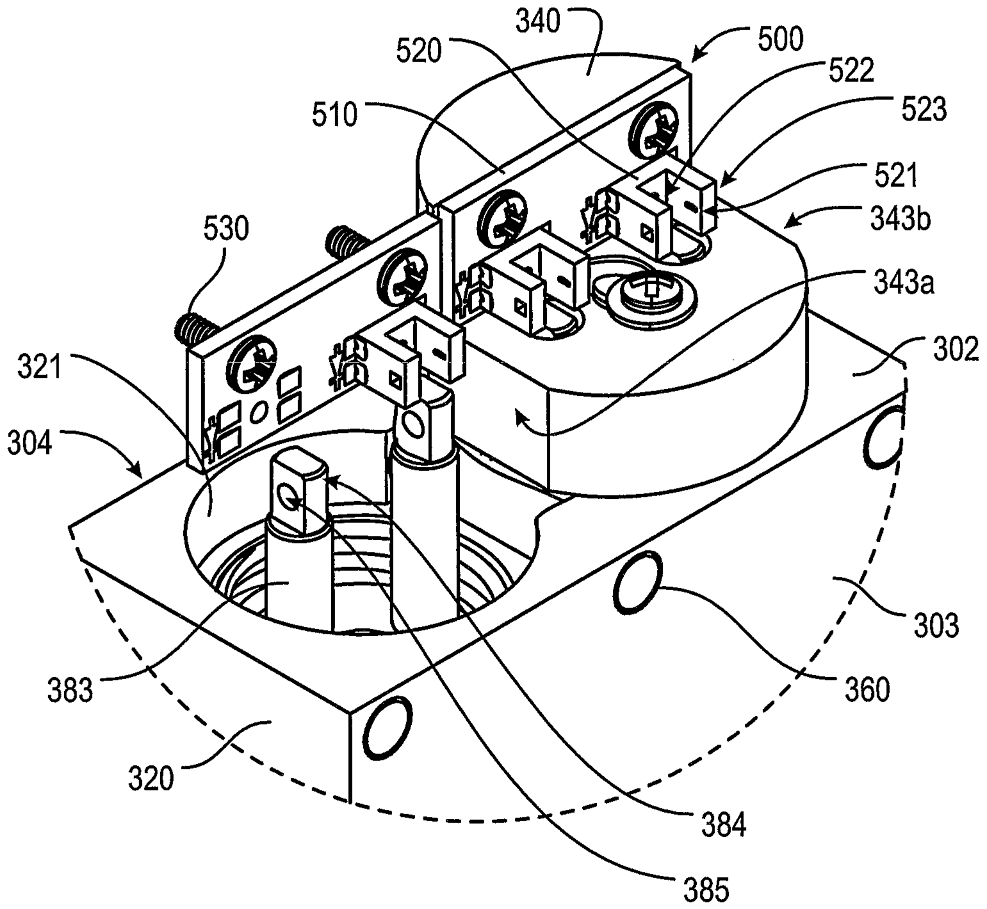
FIG. 3A illustrates an isometric view of an embodiment of a photosensor of an automated chuck system.
Figure 3B:
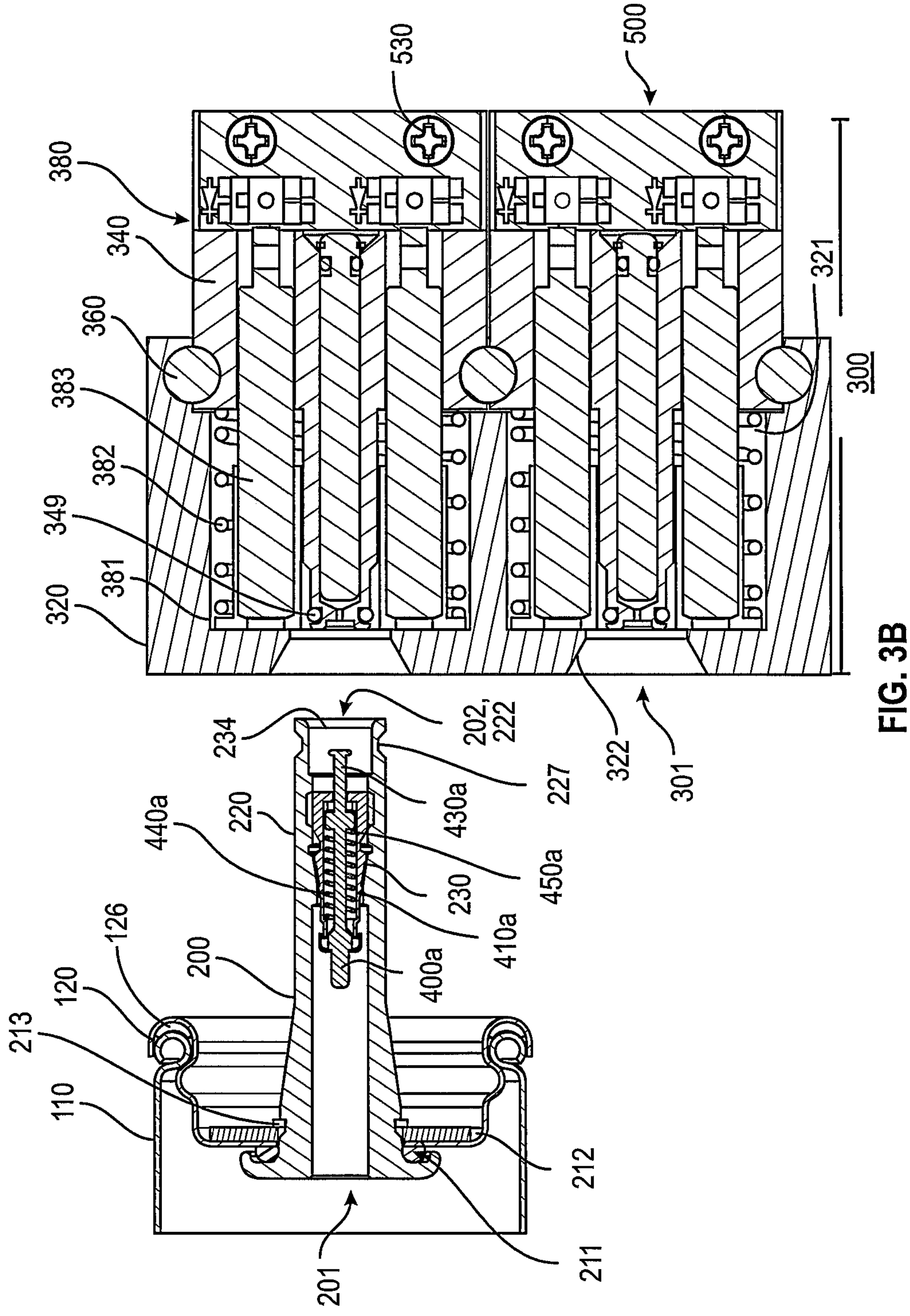
FIG. 3B illustrates a cross-sectional view of an embodiment of a gas sampling valve assembly and an automated chuck system.
Figure 6A:
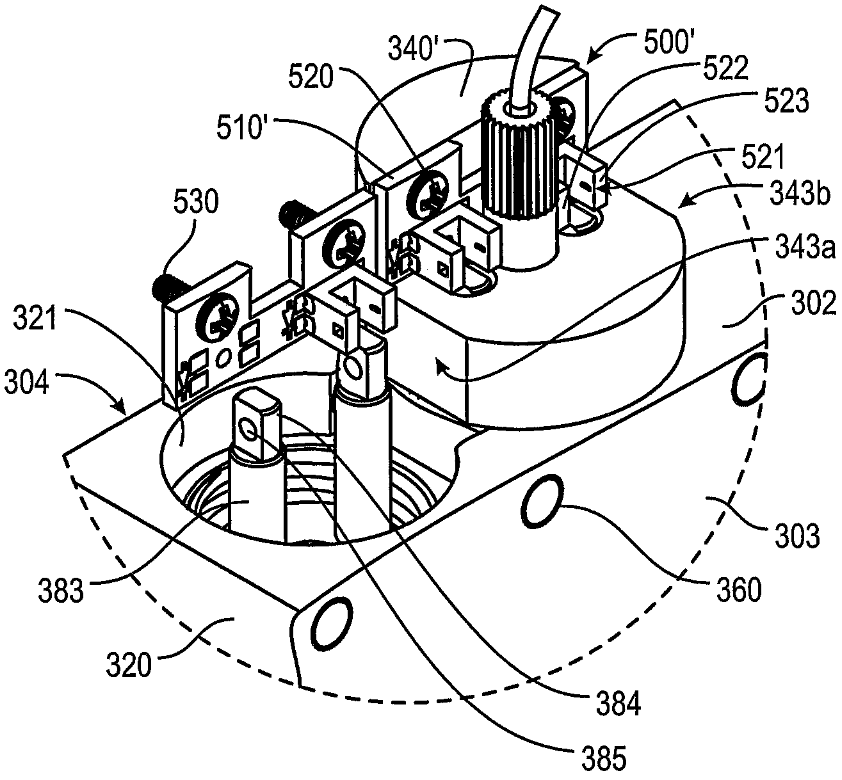
FIG. 6A illustrates an isometric view of an alternative embodiment of a photosensor of an automated chuck system.
Figure 6B:
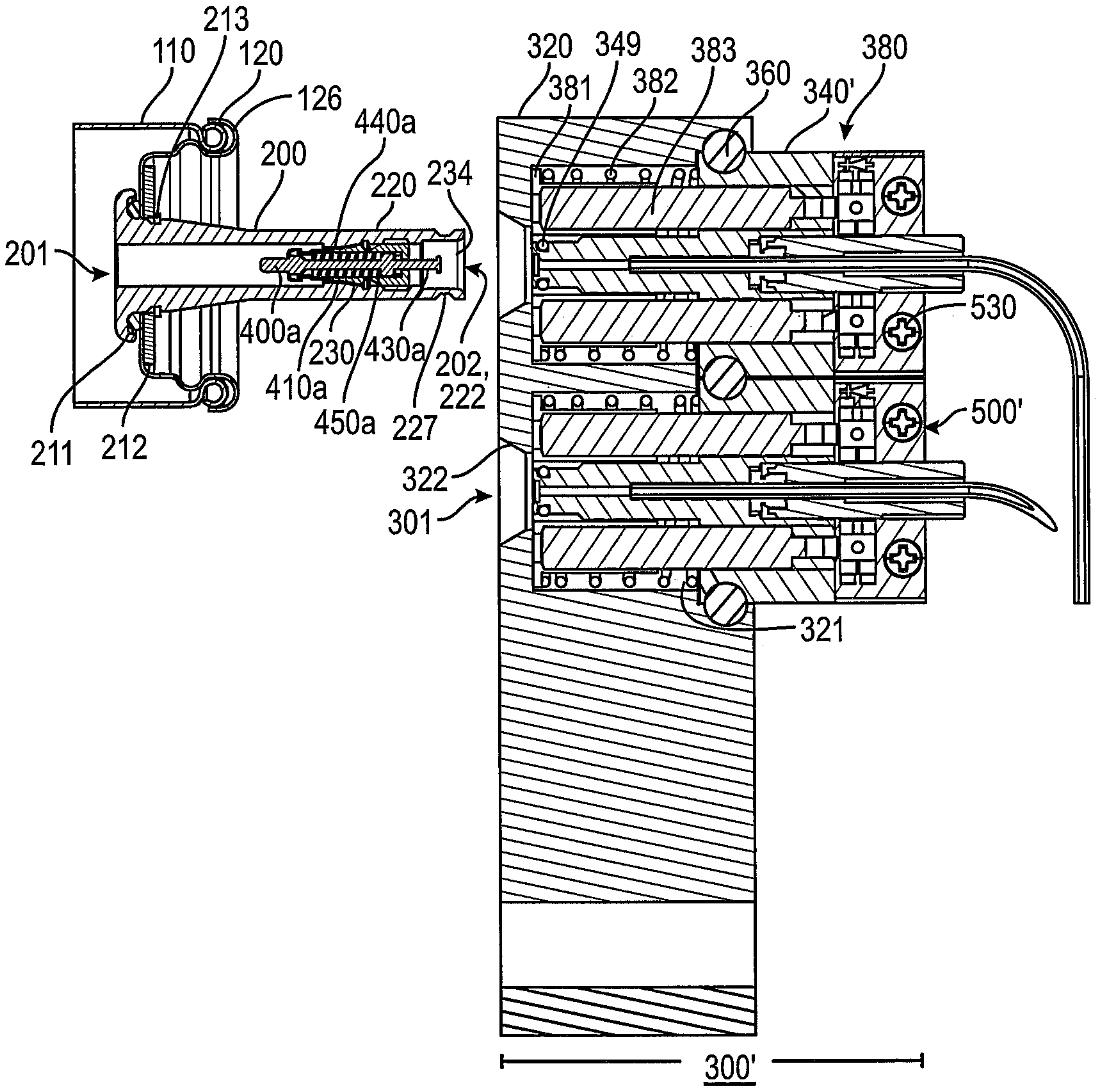
FIG. 6B illustrates a cross-sectional view of an alternative embodiment of a gas sampling valve assembly and an automated chuck system.
Figure 6C:
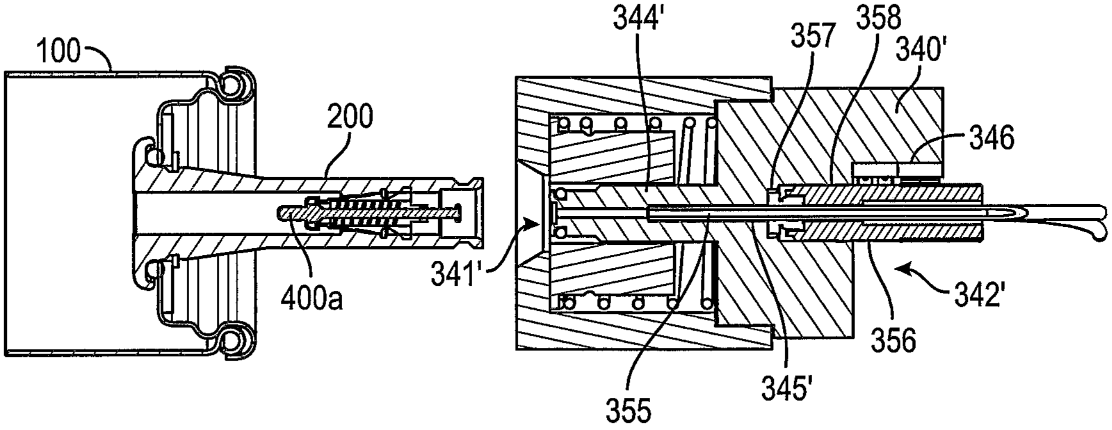
FIG. 6C illustrates a cross-section view of an alternative embodiment of a gas sampling valve assembly and an automated chuck system.

FIGS. 3A, 3B, 3C, and 3D illustrate embodiments of cap 120, valve assembly 200, and a chuck system 300. FIGS. 6A, 6B, and 6C illustrate embodiments of cap 120, valve assembly 200, and a chuck system 300'. As illustrated in FIGS. 3B and 6B, valve assembly 200 may comprise a core valve body 220 and a core valve **400*a*. In embodiments, valve body 220 may be secured into an aperture of cap 120 having one or more sealing elements 211 disposed between a flange of valve body 220 and an internal surface of cap 120, and a washer 212 being disposed between a retaining ring 213 and an external surface of cap 120, such that a valve assembly first end 201 may be interior to container 100 and a valve assembly second end 202 may be exterior to container 100 when container 100 is configured in an operable state. In embodiments, valve body 220 may be provided with an outer recessed circumferential profile 227 which may be located about valve assembly second end 202, and may further comprise a core valve seat 230. In embodiments, core valve 400*a* may be disposed within valve body 220 and seated against core valve seat 230, and may comprise a core valve body 410*a*, a core pin 430*a*, a biasing element 440*a*, and a sealing element 450*a***.

Figure 3C:
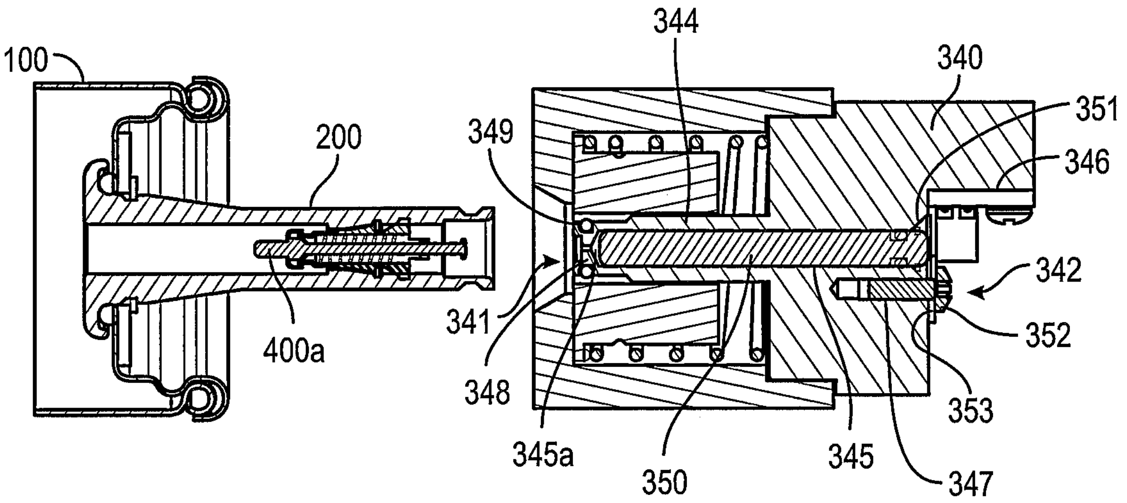
FIG. 3C illustrates a cross-section view of an embodiment of a gas sampling valve assembly and an automated chuck system.

FIGS. 3A, 3B, and 3C, as well as FIGS. 6A, 6B, and 6C, illustrate chuck system 300 and chuck system 300', respectively, which may comprise a chuck housing 320, which may be formed having one or more cavities 321, each of which may be adapted to receive an automated chuck sub-system comprising a chuck body 340,340', an interrupter system 380, and a photosensor system 500,500'.

In embodiments, chuck housing 320 may comprise a first surface 301 and an opposing second surface 302. In embodiments, each of the one or more cavities 321 may be formed at surface 302 having any suitable cross-sectional shape. For example, in embodiments each of the one or more cavities 321 may be formed having a generally circular cross-sectional shape. In embodiments, chuck housing 320 may be provided with one or more apertures 322 formed at surface 301, which correspond to each of the one or more cavities 321 and are adapted to receive valve assembly 200. In embodiments, each of the one or more apertures 322 may be formed at a location about surface 301 to share a common central axis with each of the one or more cavities 321 and may be provided with an angular internal profile reducing in radius from chuck housing first surface 301 toward an inner surface of cavity 321. As illustrated in FIG. 3A, chuck housing 320 may be further provided with one or more bores extending from a third surface 303 to an opposing fourth surface 304, each of which may be adapted to receive a chuck locking pin 360. In embodiments, chuck housing 320 may be formed of any suitable metallic or non-metallic material, for example aluminum, brass, or stainless steel.

As illustrated in FIGS. 3C and 6C, chuck body 340,340' may be generally cylindrical in shape, having a first end 341,341' and opposing second end 342,342'. In embodiments, chuck body 340,340' may be formed having opposing flat surfaces **343*a*,343*b*, which may allow a plurality of chuck bodies 340,340' to be positioned in chuck housing 320 in a proximity to each other, which may allow a single locking pin 360 to be positioned between any two of the plurality of chuck bodies 340,340', thereby securing the two chuck bodies 340,340' to chuck housing 320. In embodiments, chuck body 340,340' may be formed of any suitable metallic or non-metallic material, for example aluminum, brass, or stainless steel. In embodiments, chuck body 340, 340' may be formed having a mating projection 344,344', a central bore 345,345', and a mounting surface 346. In embodiments, chuck body 340 may further be provided with internally threaded bore 347 and one or more ports 354 as shown in FIGS. 3C and 3**D.

In embodiments, chuck body mating projection 344 may comprise a stepped, outer profile having a first segment located about chuck body first end 341, which may be adapted to be received by valve body 220 and may be provided with one or more recessed profiles 348 adapted to receive one or more sealing elements 349. In embodiments, each of the one or more sealing elements 349 may be any suitable sealing element sufficient to prevent fluid communication through the annular gap between mating portion 344 and valve body 220, for example an O-ring, and may be formed from any suitable material, for example nitrile rubber, viton, silicone, or any suitable elastomer. In an alternate embodiment, chuck body mating projection 344' may be provided with a stepped, outer profile similar to that of chuck body mating projection 344, and may be provided with one or more recessed profiles 348 adapted to receive one or more sealing elements 349.

In embodiments, chuck body central bore 345 may be formed in chuck body 340 extending from chuck body second end 342 to an internal profile **345*a* of mating projection 344 located about chuck body first end 341. In embodiments, central bore 345 may be formed having a uniform surface extending to this internal shoulder which may be adapted to receive a chuck pin 350. In embodiments, internal profile 345***a* may be formed having an aperture allowing fluid communication between chuck body first end 341 and central bore 345, and a recessed outer profile adapted to receive pin 430*a* of core valve 400*a*. In embodiments, central bore 345 may be provided with an internal profile located about chuck body second end 342 which expands in radius, thereby allowing chuck pin 350 to be fitted with a retaining ring 351, which may restrict the travel of chuck pin 350 within central bore 345 in a direction oriented toward chuck body first end 341. In an alternate embodiment, chuck body central bore 345' may differ from chuck body central bore 345 and instead be adapted to receive an inlet line 355 and a line fastener 356 having a ferrule 357, as shown in FIG. 6C. In this alternate embodiment, inlet line 355 may extend into chuck body central bore 345' to about a midpoint of chuck body central bore 345' when line fastener 356 is fully seated into corresponding threaded bore 358 of chuck body 340'.

In embodiments, chuck body mounting surface 346 may be formed perpendicular to and abut chuck body second surface 342. In embodiments, chuck body mounting surface 346 may comprise any size, shape, and configuration appropriate to receive photosensor system 500,500', and may be provided with one or more internally threaded bores for receiving one or more threaded fasteners 530 for securing photosensor system 500 to chuck body mounting surface 346.

In embodiments, chuck body 340 may be provided with internally threaded bore 347 for receiving a retaining screw 352. In embodiments, a chuck pin retaining washer 353 may be secured in place by retaining screw 352 and may restrict the travel of chuck pin 350 within central bore 345 in a direction oriented toward chuck body second end 342. In this manner, in embodiments retaining washer 353 may prevent chuck pin 350 from traveling past the surface of chuck body 340 at second end 342 during operation of chuck system 300.

Figure 3D:
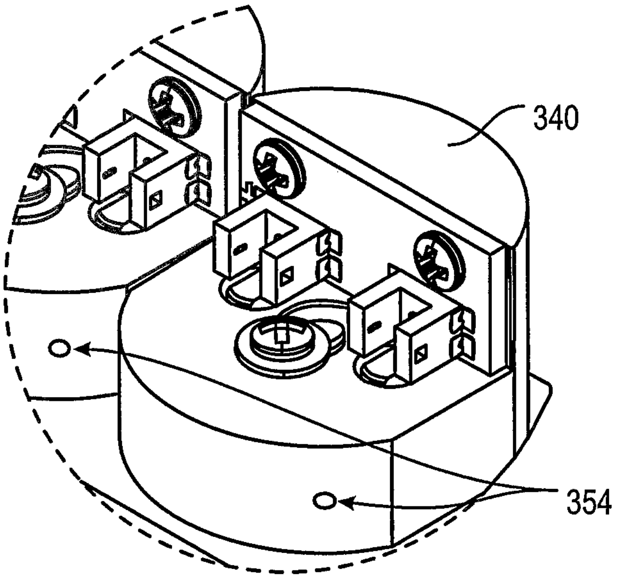
FIG. 3D illustrates an isometric view of an embodiment of a chuck port of an automated chuck system.
Figure 5:
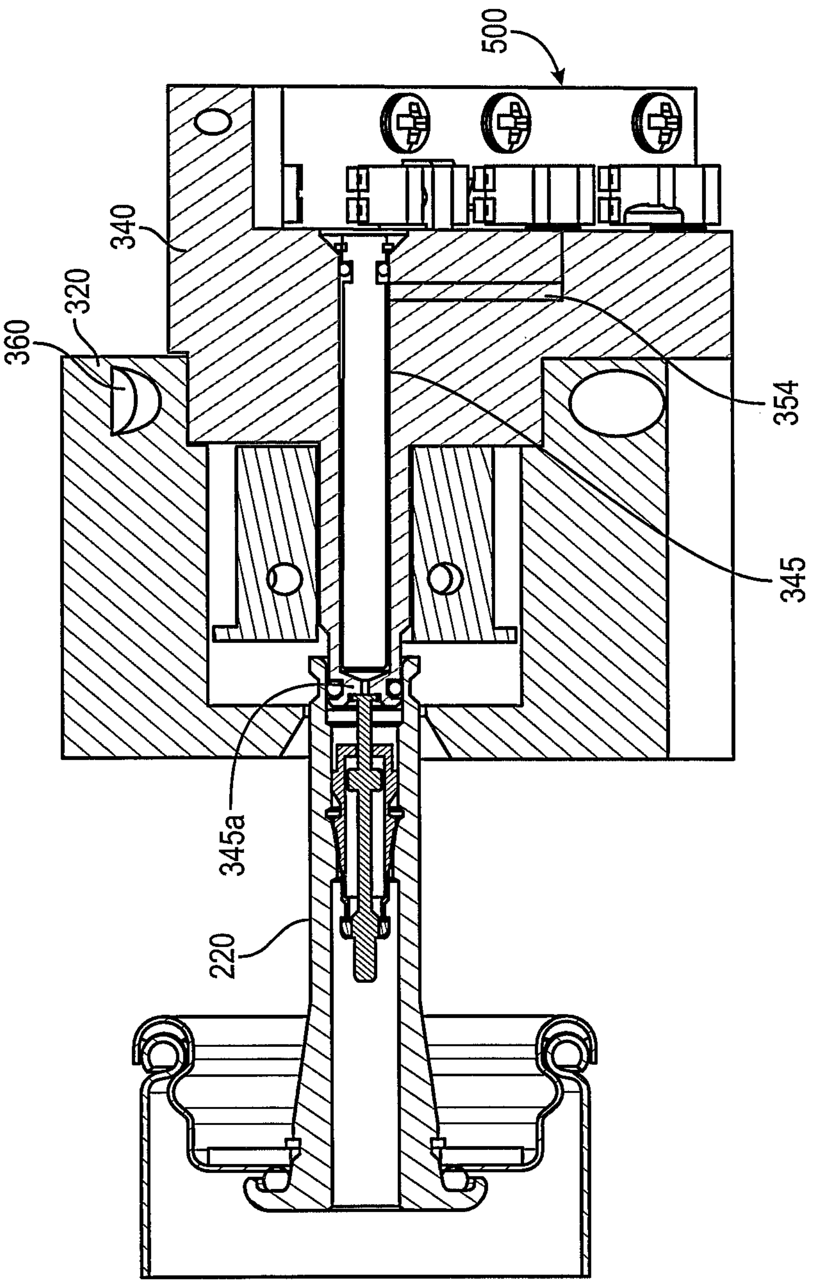
FIG. 5 illustrates a cross-sectional view of a flow path formed between embodiments of a gas sampling valve assembly and an automated chuck system.

As illustrated in FIGS. 3D and 5, chuck body 340 may be provided with one or more ports 354, which allow fluid communication between an outer surface of chuck body 340 and central bore 345. In embodiments, the one or more ports 354 may allow fluid communication between central bore 345 and a manifold (not shown) attached to the one or more ports 354. In this manner, when valve assembly 200 is mated to chuck body mating profile 344, a channel for fluid communication may be provided between valve assembly 200 and an outer surface of chuck body 340, thereby allowing valve assembly 200 to receive and/or evacuate fluid through chuck body 340. In the alternate embodiment illustrated in FIG. 6C, inlet line 355 may allow fluid communication between central bore 345' and a manifold (not shown) attached to an opposite end of inlet line 355. In this manner, when valve assembly 200 is mated to chuck body mating profile 344', a channel for fluid communication may be provided between valve assembly 200 and the manifold, thereby allowing valve assembly 200 to receive and/or evacuate fluid through chuck body 340'.

Returning to FIGS. 3A and 3B, interrupter system 380 may comprise an interrupter sleeve 381, a biasing element 382, and one or more interrupters 383.

In embodiments, interrupter sleeve 381 may be formed in a manner suitable to be disposed in cavity 321 of chuck housing 320. In embodiments, interrupter sleeve 381 may be generally cylindrical in shape and have an outer profile providing a seat suitable for receiving biasing element 382, and may be formed having a length which allows interrupter sleeve 381 to slide within cavity 321 such that interrupter sleeve 381 may approach or come into resting contact against chuck body 340,340' when valve assembly 200 is fully seated into chuck system 300,300'. In embodiments, interrupter sleeve 381 may be provided with a central bore allowing interrupter sleeve to remain in sliding contact with chuck body mating projection 344,344' while valve assembly 200 is transitioned between an unseated and a fully seated configuration. In embodiments, interrupter sleeve 381 may be provided with one or more seats suitable for receiving one or more interrupters 383 as illustrated in FIGS. 3B and 6B. In embodiments, interrupter sleeve 381 may be formed of any suitable metallic or non-metallic material, for example aluminum, brass, or stainless steel.

In embodiments, interrupter sleeve biasing element 382 may surround interrupter sleeve 381 and may be compressed between the seat of interrupter sleeve 381 and chuck body 340,340', which may bias interrupter sleeve 381 toward a first position away from chuck body 340,340'. In this manner, interrupter sleeve 381 may be biased to communicate with valve body 220, such that when a force is applied by valve body 220 against interrupter sleeve 381, interrupter sleeve 381 may travel toward a second position wherein interrupter sleeve 381 may approach or come into resting contact against chuck body 340,340', and interrupter sleeve 381 may be biased to return to the first position by biasing element 382 following a reduction in the force being applied by valve body 220 against interrupter sleeve 381. In embodiments, biasing element 382 may be any suitable biasing element capable of biasing interrupter sleeve 381, for example biasing element 382 may be a spring. In embodiments, biasing element 382 may be formed of any suitable metallic material, for example stainless steel.

In embodiments, interrupter 383 may be formed having any shape and size suitable to be seated within interrupter sleeve 381. For example, in embodiments interrupter sleeve 381 may be generally cylindrical. In embodiments, interrupter 383 may be formed having a length such that when interrupter 383 is fully seated in interrupter sleeve 381, and interrupter sleeve 381 is fully biased away from chuck body 340,340' when chuck system 300,300' is in an operational configuration, interrupter 383 may not extend past the surface of chuck body 340,340' at second end 342,342'. In embodiments, interrupter 383 may be formed having a tip 384, which may comprise an aperture 385. In an operational configuration, interrupter 383 may be disposed in a seat of interrupter sleeve 381 such that tip 384 may extend past the surface of chuck body 340,340' at second end 342,342' when interrupter sleeve 381 may approach or come into resting contact against chuck body 340,340'. In embodiments, interrupter tip 384 may be formed having any size, profile, or shape suitable to be received by a photosensor body 520 as will be described. In embodiments, interrupter 383 may be formed of any suitable metallic or non-metallic material, for example aluminum, brass, or stainless steel.

As illustrated in FIG. 3A, photosensor system 500,500' may comprise printed circuit board 510,510', which may be fitted with one or more photosensor bodies 520 and be secured to chuck body mounting surface 346 by one or more fasteners 530. In embodiments, each of the one or more photosensor bodies 520 may provide redundancy in the operation of each of the one or more automated chuck sub-systems comprising chuck system 300,300'.

In embodiments, printed circuit board 510,510' may provide suitable conductive mounting points for each of the one or more photosensor bodies 520, and may be provided with one or more apertures suitable to allow the one or more fasteners 530 to mount printed circuit board 510,510' to chuck body mounting surface 346. In embodiments, printed circuit board 510, 510' may be formed to provide additional suitable electrically conductive paths which may be desired to allow automated chuck system 300,300' to communicate with control equipment.

In embodiments, photosensor body 520 may be provided with a photosensor window 521, having an emitter side 522 and a sensor side 523. In embodiments, emitter side 522 may be in optical communication with sensor side 523, such that an interruption in this optical communication may be detected by photosensor system 500. In this manner, as interrupter sleeve 381 may be slidably transitioned toward a second position wherein interrupter sleeve 381 may approach or come into resting contact against chuck body 340,340', causing interrupter 383 to extend past the surface of chuck body 340,340' at second end 342,342', and interrupter tip 384 may break the optical communication between emitter side 522 and sensor side 523 until interrupter sleeve 381 is positioned at the second position near or in resting contact against chuck body 340,340', thereby allowing aperture 385 to come into a position between emitter side 522 and sensor side 523 and allowing the optical communication to be restored through aperture 385. In embodiments, photosensor body 520 may thus detect when interrupter sleeve 381 may be fully biased toward and/or against chuck body 340,340', indicating that valve body 220 may be fully seated against mating projection 344,344', in turn allowing fluid communication between valve assembly 200 and chuck body 340,340'. In embodiments, the chuck system 300,300' may comprise a plurality of interrupters 383 and photosensor bodies 520 for purposes of redundancy.

Under operational conditions, chuck system 300,300' may be transitioned toward valve assembly 200 until valve assembly 200 becomes fully seated into chuck system 300,300', which may progress through a number of intermediate seating relationships until becoming fully seated. In embodiments, the positioning of chuck system 300,300' may be transitioned toward or away from valve assembly 200 by way of automated mechanical means, for example, a stepper motor.

As illustrated by FIGS. 4A through 4E, chuck system 300 may begin to be transitioned toward a fully seated configuration, wherein valve assembly second end 202 may become introduced into one of the one or more apertures 322 of chuck housing 320, coming into contact with a portion of a surface of interrupter sleeve 381, and progressively receiving such that chuck body mating projection 344 is introduced into a valve body second end 222, with mating projection sealing element 349 slidably engaging a valve body internal surface 234.

Figure 4A:
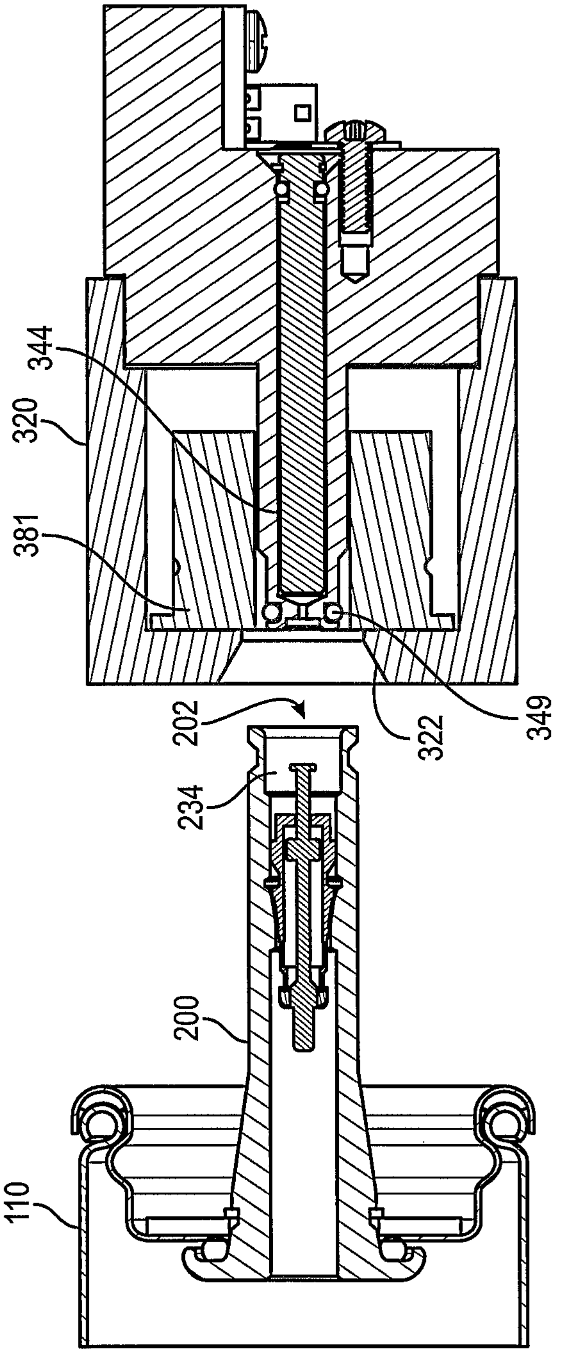
FIG. 4A illustrates a cross-sectional view of an embodiment of a gas sampling valve assembly and an automated chuck system when disconnected.
Figure 4B:
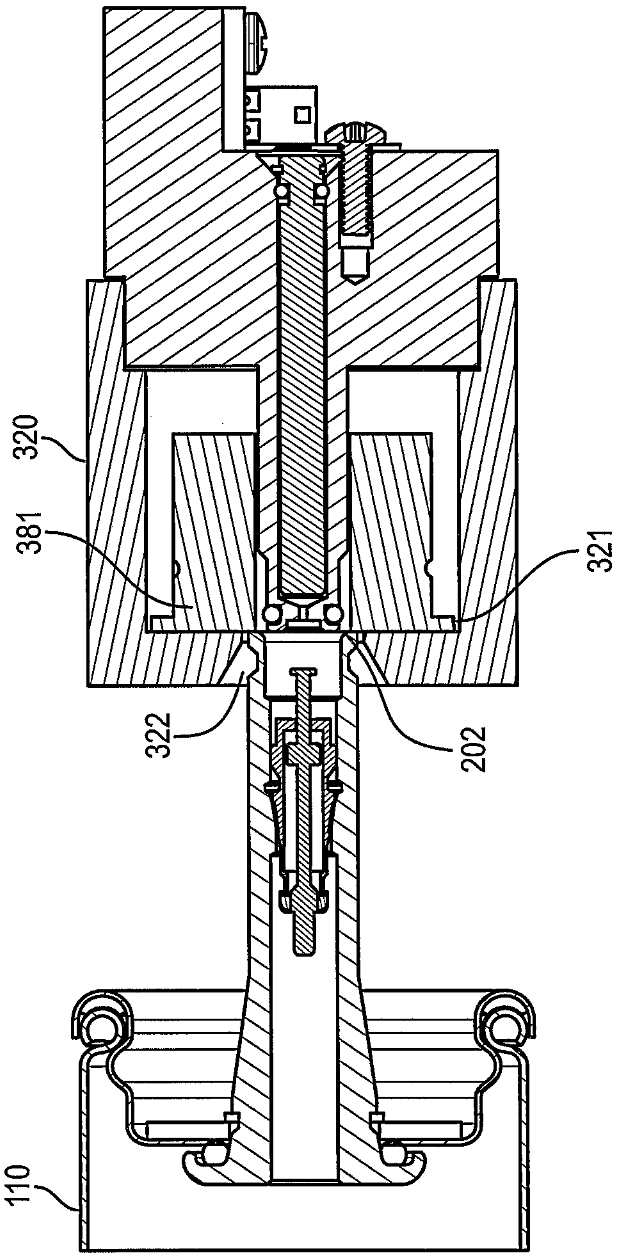
FIG. 4B illustrates a cross-sectional view of an embodiment of a gas sampling valve assembly and an automated chuck system wherein an interrupter sleeve is in contact with the valve assembly.
Figure 4C:
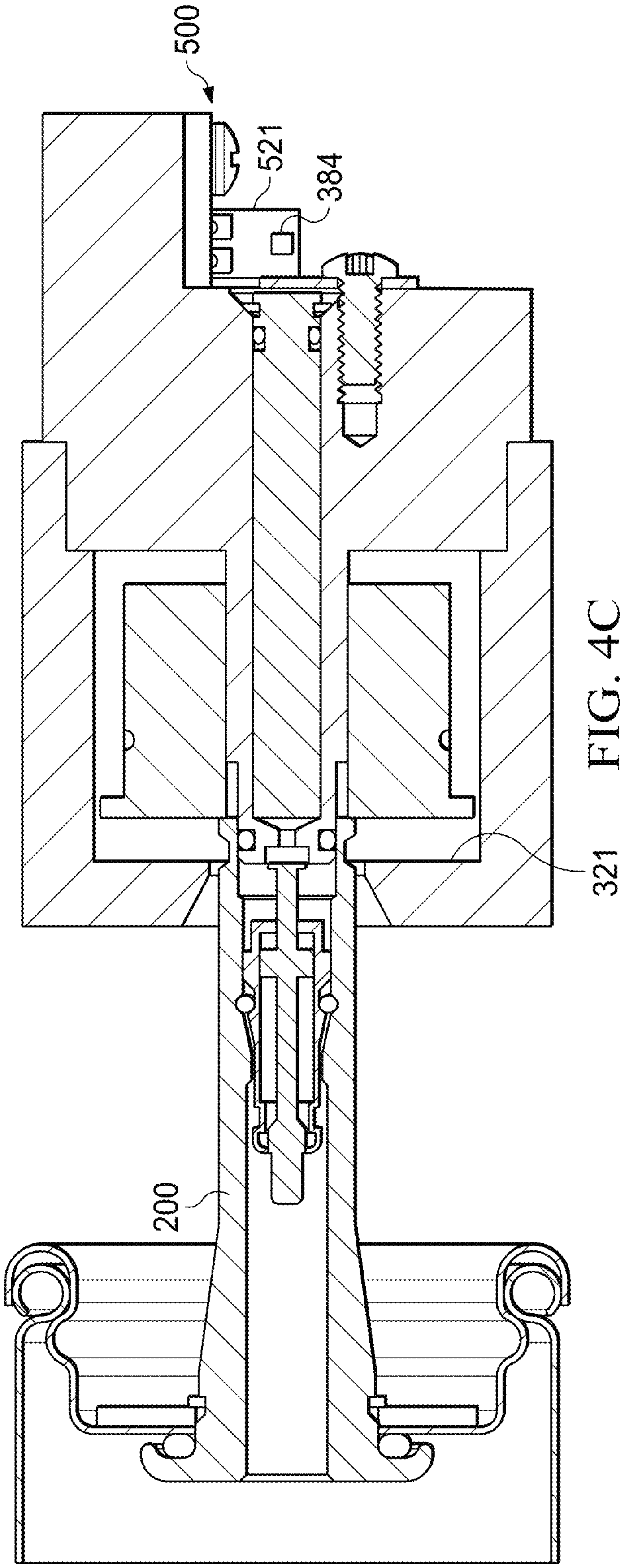
FIG. 4C illustrates a cross-sectional view of an embodiment of a gas sampling valve assembly and an automated chuck system wherein an interrupter obstructs a photosensor window.
Figure 4D:
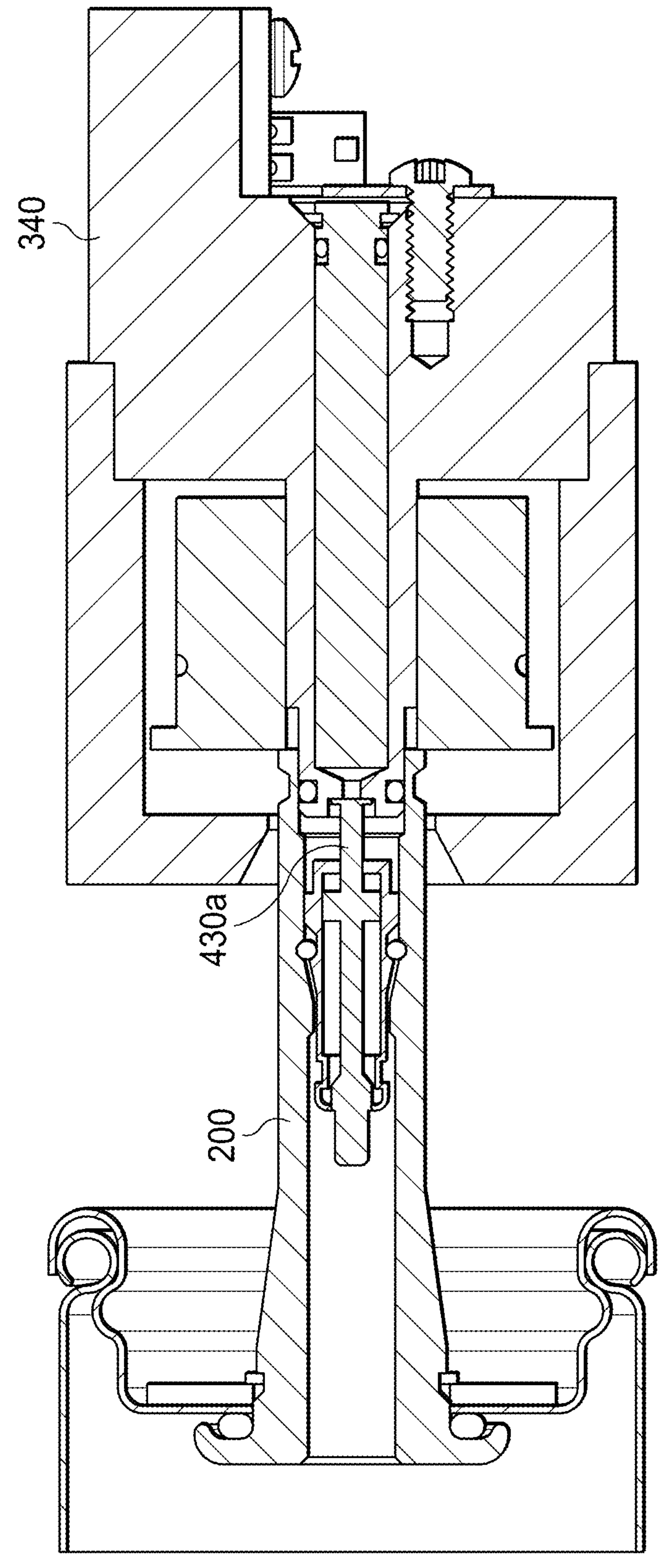
FIG. 4D illustrates a cross-sectional view of an embodiment of a gas sampling valve assembly and an automated chuck system wherein an interrupter obstructs a photosensor window.
Figure 4E:
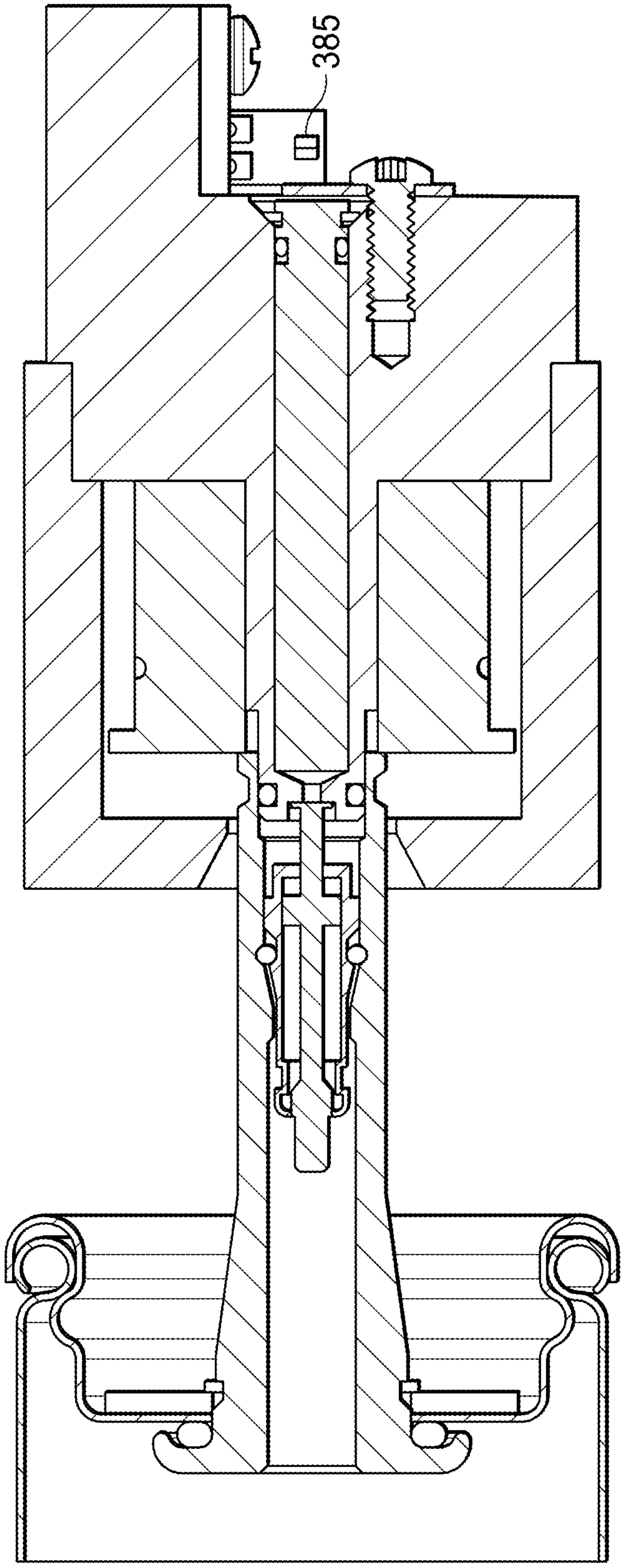
FIG. 4E illustrates a cross-sectional view of an embodiment of a gas sampling valve assembly and an automated chuck system wherein a photosensor window is unobstructed.

FIG. 4A illustrates the valve assembly 200 and the chuck system 300 disconnected. At a first intermediate seating relationship illustrated by FIG. 4B, a surface of interrupter sleeve 381 may become seated against a surface of valve body second end 222, guided by the angular internal profile aperture 322. In this manner, as chuck system 300 continues to be transitioned toward a fully seated configuration, valve body second end 222 may cause interrupter sleeve 381 to become unseated from its biased resting position against an internal wall of cavity 321, as illustrated by FIG. 4C.

In embodiments, chuck system 300 may then progress through a second intermediate seating relationship, whereby the leading edge of interrupter tip 384 may be introduced into photosensor window 521, thereby suspending the optical communication between emitter side 522 and sensor side 523, altering an output of photosensor system 500, and communicating to a controller (not shown) that chuck system 300 may be receiving valve assembly 200, at which time the stepper motor may stop. During this transitory seating relationship, fluid held within the internal chuck volume may be caused to evacuate from the internal chuck volume until a pressure being detected by a sensor (not shown) and communicated to the controller reaches a predetermined pressure reading, at which time the stepper motor may be caused to resume its progression of chuck system 300 toward a fully seated configuration.

In embodiments, chuck system 300 may then progress toward a fully seated configuration, upon which the optical communication between emitter side 522 and sensor side 523 may be restored through aperture 385 of interrupter 383, causing the stepper motor to stop. In this fully seated configuration, the fluid communication path between fluid container 110 and chuck body 340 may become fully open as illustrated in FIG. 5, and the process of purging air and drawing sample into fluid container 110 may begin.

Upon completing the drawing of the sample into fluid container 110, the process just described may be reversed. In embodiments, as chuck system 300 is moved away from valve assembly 200, core valve 400*a* may be closed prior to separation of chuck system 300 from valve assembly 200, thereby allowing fluid container 110 to remain pressurized.

Although the present invention and its advantages have been described in detail, it should be understood that various changes, substitutions and alterations may be made herein without departing from the spirit and scope of the invention as defined by the appended claims.

What is claimed is:

1. A gas sampling system comprising:

a valve body comprising an exterior end;

a chuck system comprising:

- a chuck housing comprising an internal cavity;
- a first chuck body disposed within the internal cavity of the chuck housing and comprising a central bore;
- a chuck pin disposed within the central bore of the first chuck body;
- an interrupter sleeve and an interrupter disposed within the internal cavity of the chuck housing and biased to a first position;
- a sensor configured to sense a position of the interrupter; and a motor configured to transition the chuck system toward or away from the valve body;

wherein the exterior end of the valve body is configured to cause the interrupter sleeve and interrupter to move within the internal cavity of the chuck housing from the first position to a second position.

2. The gas sampling system of claim 1, further comprising a first chuck locking pin configured to secure the first chuck body to the chuck housing.

3. The gas sampling system of claim 2, further comprising:

a second chuck body disposed within the internal cavity of the chuck housing; and a second chuck locking pin configured to secure the second chuck body to the chuck housing.

4. The gas sampling system of claim 1, wherein the sensor comprises a photosensor comprising an emitter side and a sensor side.

5. The gas sampling system of claim 4, wherein the interrupter comprises an interrupter tip configured to interrupt optical communication between the emitter side and the sensor side when the interrupter is moved from the first position to the second position.

6. The gas sampling system of claim 5, wherein the interrupter tip comprises an aperture configured to restore optical communication between the emitter side and the sensor side when the interrupter is moved from the second position to a third position.

7. The gas sampling system of claim 1, wherein the motor is a stepper motor.

8. The gas sampling system of claim 1, wherein the chuck housing further comprises an angular internal profile aperture configured to guide the exterior end of the valve body.

9. The gas sampling system of claim 1, wherein the chuck body comprises one or more ports.

10. The gas sampling system of claim 1, wherein the chuck body comprises an inlet line.

11. A method of sampling gas, comprising:

providing a valve body comprising an exterior end;

providing a chuck system comprising:

a chuck housing comprising an internal cavity;

a first chuck body disposed within the internal cavity of the chuck housing and comprising a central bore;

a chuck pin disposed within the central bore of the first chuck body;

an interrupter sleeve and an interrupter disposed within the internal cavity of the chuck housing and biased to a first position; and a sensor;

activating a motor, such that:

the valve body moves toward the chuck system; and the exterior end of the valve body engages the interrupter sleeve and causes the interrupter to move within the internal cavity of the chuck housing from the first position to a second position that is sensed by the sensor; and deactivating the motor.

12. The method of claim 11, wherein the sensor comprises a photosensor comprising an emitter side and a sensor side.

13. The method of claim 12, wherein:

the interrupter comprises an interrupter tip; and movement of the interrupter from the first position to the second position causes the interrupter tip to interrupt optical communication between the emitter side and the sensor side.

14. The method of claim 13, wherein:

the interrupter tip comprises an aperture; and the method further comprises:

reactivating the motor to move the interrupter from the second position to a third position, such that optical communication between the emitter side and the sensor side is restored; and deactivating the motor.

15. The method of claim 14, further comprising reactivating the motor, such that the valve body moves away from the chuck system.

16. The method of claim 11, further comprising reactivating the motor, such that the valve body moves away from the chuck system.

17. The method of claim 11, wherein the motor is a stepper motor.

18. The method of claim 11, wherein the chuck housing further comprises an angular internal profile aperture configured to guide the exterior end of the valve body.

* * * * *